United States Patent [19]
Single et al.

[11] Patent Number: 6,149,187
[45] Date of Patent: Nov. 21, 2000

[54] DOOR ASSEMBLY FOR AN INFLATABLE RESTRAINT SYSTEM

[75] Inventors: Arthur Single, Plymouth; Richard David Arndt, Novi, both of Mich.

[73] Assignee: Visteon Global Technologies, Inc., Dearborn, Mich.

[21] Appl. No.: 09/317,739

[22] Filed: May 24, 1999

[51] Int. Cl.$^7$ .................................................. B60R 21/16
[52] U.S. Cl. ................................... 280/728.3; 280/732
[58] Field of Search ................................. 280/728.3, 732

[56] References Cited

U.S. PATENT DOCUMENTS

| | | | |
|---|---|---|---|
| 5,096,221 | 3/1992 | Combs et al. | 280/732 |
| 5,219,177 | 6/1993 | Wang | 280/728.3 |
| 5,306,042 | 4/1994 | Frank | 280/728.3 |
| 5,332,257 | 7/1994 | Rogers et al. | 280/728.3 |
| 5,398,959 | 3/1995 | Avila | 280/728.3 |
| 5,447,327 | 9/1995 | Jarboe et al. | 280/728.3 |
| 5,458,365 | 10/1995 | Rogers et al. | 280/728.3 |
| 5,556,126 | 9/1996 | Lee | 280/728.3 |
| 5,792,413 | 8/1998 | Ang et al. | 264/515 |

*Primary Examiner*—Kenneth R. Rice
*Attorney, Agent, or Firm*—Charles H. Ellerbrock

[57] ABSTRACT

A door assembly for an inflatable restraint system mounted in a motor vehicle includes a deployment door closing a deployment opening in vehicle structure. The door assembly also includes at least one tether connected to the deployment door and operatively connected to the vehicle structure to retain the deployment door to the vehicle structure after inflation of an inflatable restraint of the inflatable restraint system.

17 Claims, 2 Drawing Sheets

DOOR ASSEMBLY FOR AN INFLATABLE RESTRAINT SYSTEM

BACKGROUND OF THE INVENTION

1. Field of the Invention

The present invention relates generally to inflatable restraints and, more specifically, to a door assembly for an inflatable restraint system for a motor vehicle.

2. Description of the Related Art

A particular type of inflatable restraint for an occupant in a motor vehicle is commonly referred to as an air bag. The air bag is stored in the motor vehicle in an uninflated condition. When the motor vehicle experiences a collision-indicating condition of at least a predetermined threshold level, gas is directed to flow into the air bag from a gas producing source. The gas inflates the air bag to an extended condition in which the air bag extends into the occupant compartment of the motor vehicle. When the air bag is inflated into the occupant compartment, it restrains movement of the occupant to help protect the occupant from forcefully striking parts of the motor vehicle as a result of the collision.

For a passenger side air bag application, the air bag may be mounted in the instrument panel of the vehicle as a part of an air bag module. In addition to the air bag, the air bag module includes an inflator. The inflator is source of gas for inflating the air bag. The instrument panel has a deployment opening through which the air bag emerges when it is being inflated.

Typically, a deployment door extends over the deployment opening to conceal the air bag and the other parts of the air bag module from the occupant compartment. The deployment door is typically part of the air bag module and fits underflush to the instrument panel of the motor vehicle.

When the inflator is actuated, gas is directed from the inflator into the air bag. As the gas enters the air bag, it moves the air bag outward through the deployment opening and forcefully against the deployment door. A closure portion of the deployment door is ruptured by the force of the fluid pressure in the air bag. As the air bag continues to move outward against the deployment door, it forcefully deflects a hinge portion of the deployment door so as to move the deployment door pivotally away from the deployment opening. The deployment door is thus opened and moved pivotally out of the path of the air bag as the air bag is inflated outward from the inflator through the deployment opening and into the occupant compartment.

Although the above air bag and air bag module has worked well when mounted in the instrument panel, there is a need in the art to provide a definitive indicator of previous air bag deployment. Also, there is a need in the art to provide a low cost repair or deployment door for the deployment opening without removal of the instrument panel to provide a new air bag module with a deployment door.

SUMMARY OF THE INVENTION

Accordingly, the present invention is a door assembly for an inflatable restraint system mounted in a motor vehicle. The door assembly includes a deployment door closing a deployment opening in vehicle structure after the inflatable restraint system has been activated. The door assembly includes at least one tether connected to the deployment door and operatively connected to the vehicle structure to limit forward movement of the deployment door and retain the deployment door to the vehicle structure after inflation of an inflatable restraint of the inflatable restraint system.

One feature of the present invention is that a door assembly is provided for a passenger side inflatable restraint system in an instrument panel of a motor vehicle. Another feature of the present invention is that the door assembly provides a definitive indicator of previous air bag deployment. Yet another feature of the present invention is that the door assembly allows for a low cost repair or deployment door without removal of the instrument panel to provide a new module with a door.

Other features and advantages of the present invention will be readily appreciated, as the same becomes better understood after reading the subsequent description when considered in connection with the accompanying drawings.

DESCRIPTION OF THE PREFERRED EMBODIMENT(S)

Figure 1:
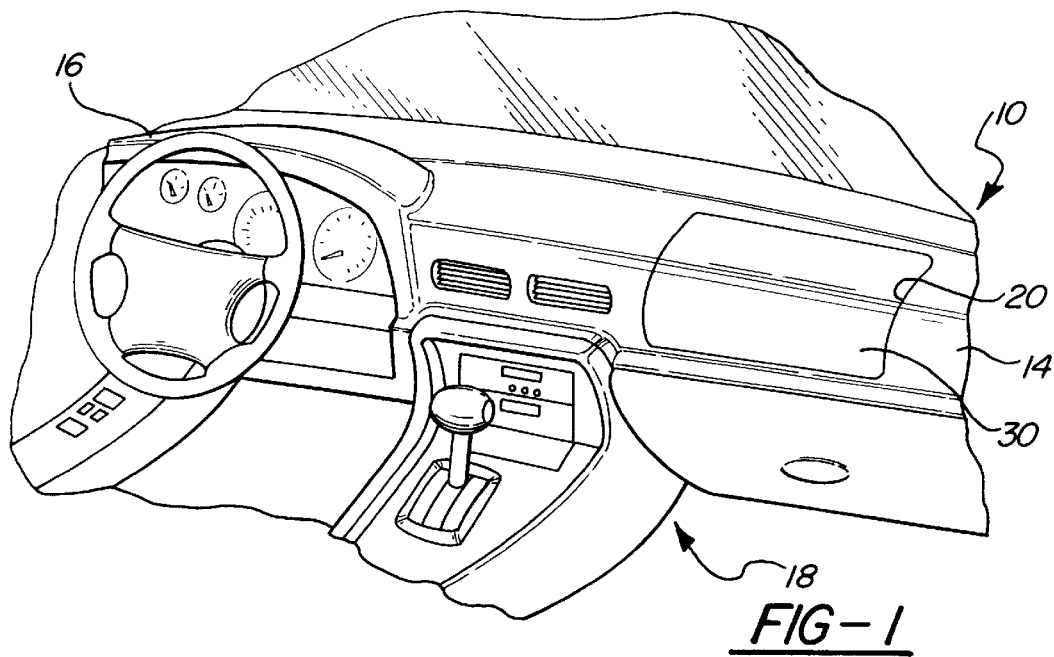
FIG. 1 is a perspective view of a door assembly, according to the present invention, illustrated in operational relationship with an instrument panel of a motor vehicle.
Figure 2:
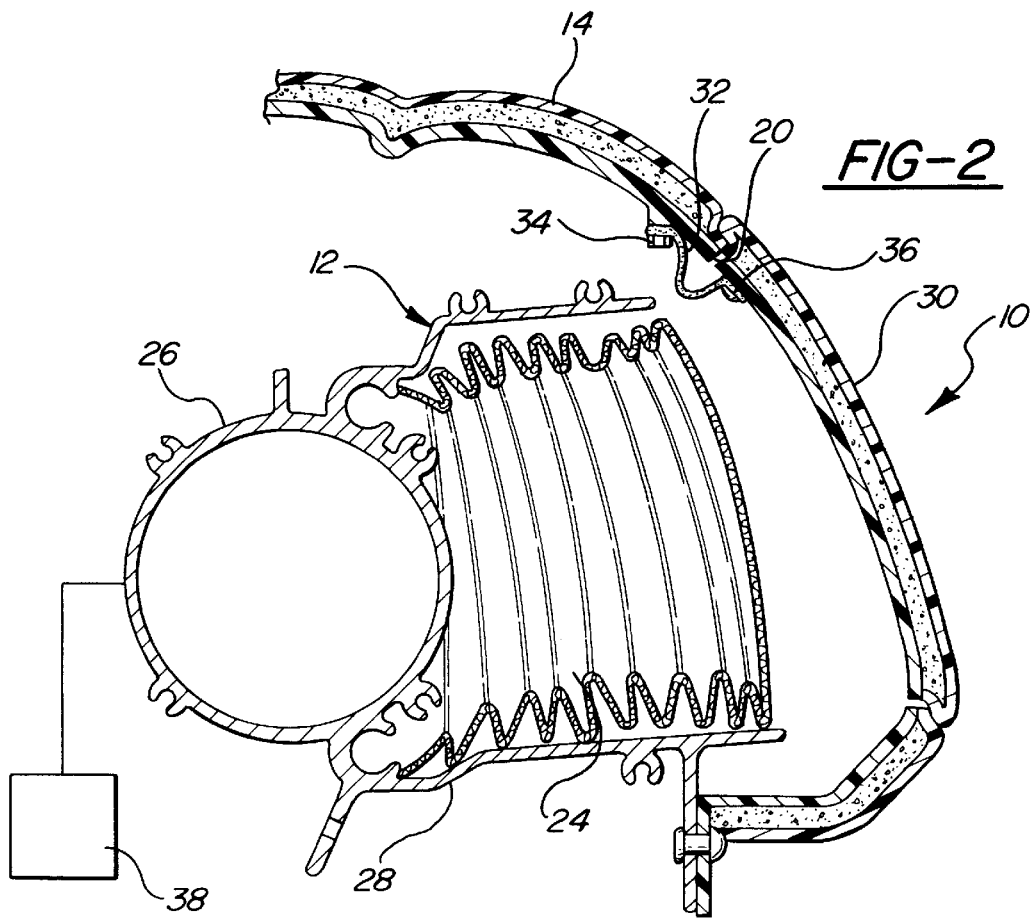
FIG. 2 is a fragmentary elevational view of the door assembly and instrument panel of FIG. 1.

Referring to the drawings and in particular FIGS. 1 and 2, one embodiment of a door assembly 10, according to the present invention, for a passenger side inflatable restraint system, generally indicated at 12, is illustrated in operational relationship with an instrument panel 14 for a motor vehicle 16. The instrument panel 14 extends transversely across an occupant compartment 18 of the motor vehicle 16. The instrument panel 14 has a deployment opening 20 located opposite a seat (not shown) for a passenger occupant of the motor vehicle 16.

Figure 3:
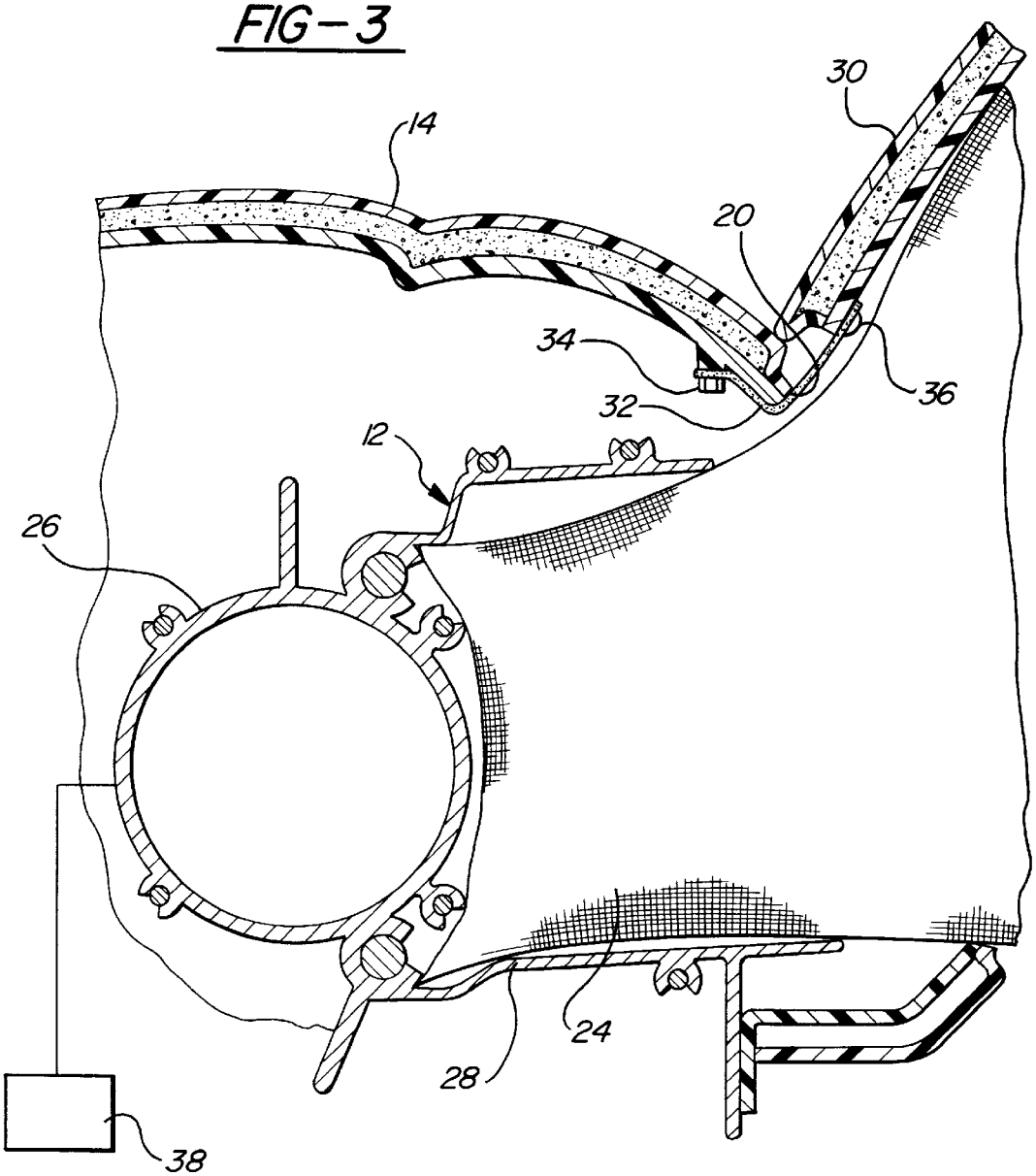
FIG. 3 is a view similar to FIG. 2 illustrating deployment of the door assembly of FIG. 1.

Referring to FIGS. 1 through 3, the passenger side inflatable restraint system 10 includes an inflatable restraint 24 such as an air bag and an inflatable restraint module 26 for inflating the inflatable restraint 24. The inflatable restraint module 26 is removably fastened to the instrument panel 14 by suitable fastening mechanisms (not shown). The inflatable restraint module 26 includes an inflator (not shown) and a reaction canister 28. The inflator is the source of inflation fluid or gas for inflating the inflatable restraint 24. The reaction canister 28 is generally U-shaped in cross-section and extends outwardly to contain the inflator and the inflatable restraint 24.

The door assembly 10 includes a post deployment door 30 to close the deployment opening 20 in the instrument panel 14. The deployment door 30 is a panel made of a relatively hard or soft material, such as an elastomeric material, which is strong enough to withstand the force of the deploying side inflatable restraint 24 and as strong as the instrument panel 14. The deployment door 30 has a shape complementary to the shape of the deployment opening 20. The deployment door 30 is disposed in the deployment opening 20 and held in place by a wedged or interference fit. Alternatively, the deployment door 30 may overlap the instrument panel 14 at the upper and lower edges of the deployment opening 20 to cover possible damage to the instrument panel 14 from the first deployment of the side inflatable restraint 24. It should be appreciated that this deployment door 30 would cover the deployment opening 20 after deployment of the original deployment door (not shown) from the inflatable restraint module 26.

The door assembly 10 includes at least one, preferably two or more tethers 32 interconnecting the deployment door 30 and the instrument panel 14. The tether 32 is made of an elastomeric material and extends axially. The tether 32 may have one end connected to the instrument panel 14 by suitable means such as a fastener 34. The tether 32 may have another end connected to an upper portion of the deployment door 30 by suitable means such as a fastener 36. The tether 32 limits rearward movement of the deployment door 30 and retains the deployment door 30 to the instrument panel 14 after inflation of the inflatable restraint 24.

Referring to FIG. 3, when the motor vehicle 16 experiences a collision-indicating condition of at least a predetermined threshold level, the inflator is actuated by a controller 38 and a gas flows from the inflator into the inflatable restraint 24. As the gas enters the inflatable restraint 24, it moves the inflatable restraint 24 outward from the reaction canister 28. As the inflatable restraint 24 deploys, it moves the deployment door 30 outward from the deployment opening 20. The inflatable restraint 24 is inflated outward from the deployment opening 20 to extend into the occupant compartment 18 of the motor vehicle 16. The deployment door 30 rotates upward and is limited in movement by the tether 32. When the inflatable restraint 24 is inflated into the occupant compartment 18, it restrains movement of the occupant to help protect the occupant from forcefully striking parts on the side of the motor vehicle 16 as a result of the collision. After the inflatable restraint 24 is deflated, the tether 32 retains the deployment door 30 to the instrument panel 14. The inflatable restraint 24 may then be refolded or replaced in the side inflatable restraint module 26 and the deployment door 30 disposed or fitted into the deployment opening 20. The operation may then be repeated. It should be appreciated that, while the embodiment illustrated is for a passenger side application, the present invention can be used for a driver side application, side impact application, etc., in the motor vehicle.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A door assembly for an inflatable restraint system mounted in a motor vehicle comprising:

a post deployment door for the inflatable restraint system closing a deployment opening in vehicle structure and overlapping edges of the deployment opening after an inflatable restraint of the inflatable restraint system has been deployed at least once; and at least one tether connected to the deployment door and operatively connected to the vehicle structure to limit rearward movement of the deployment door and retain the deployment door to the vehicle structure after inflation of an inflatable restraint of the inflatable restraint system.

2. A door assembly as set forth in claim 1 including a fastening mechanism for fastening said at least one tether to the vehicle structure.

3. A door assembly as set forth in claim 1 including a fastening mechanism for fastening said at least one tether to said deployment door.

4. A door assembly as set forth in claim 1 wherein said deployment door is made of a relatively hard material.

5. A door assembly as set forth in claim 1 wherein said deployment door is made of a relatively soft material.

6. A door assembly as set forth in claim 1 wherein said deployment door is held in the deployment opening by interference fit.

7. A door assembly as set forth in claim 1 wherein said at least one tether is made of an elastomeric material.

8. A door assembly as set forth in claim 1 wherein said deployment door has a shape complementary to the deployment opening.

9. A door assembly as set forth in claim 1 wherein said deployment door is a panel.

10. A door assembly as set forth in claim 9 wherein said panel is made of an elastomeric material.

11. A passenger side inflatable restraint deployment system for an instrument panel of a motor vehicle comprising:

an inflatable restraint module disposed within an instrument panel and having an inflatable restraint;

a post deployment door closing a deployment opening in the instrument panel and overlapping edges of the deployment opening after an inflatable restraint has been deployed at least once; and at least one tether connected to said deployment door and operatively connected to the instrument panel to limit rearward movement of said deployment door and retain said deployment door to the instrument panel after inflation of said inflatable restraint.

12. A passenger side inflatable restraint deployment system as set forth in claim 11 wherein said deployment door is made of an elastomeric material.

13. A passenger side inflatable restraint deployment system as set forth in claim 11 wherein said tether is made of an elastomeric material.

14. A passenger side inflatable restraint deployment system as set forth in claim 13 including a fastening mechanism for fastening said at least one tether to the instrument panel.

15. A passenger side inflatable restraint deployment system as set forth in claim 13 including a fastening mechanism for fastening said at least one tether to said deployment door.

16. A passenger side inflatable restraint deployment system as set forth in claim 13 wherein said inflatable restraint module comprises an inflator for inflating said inflatable restraint and a reaction canister containing said inflatable restraint and said inflator.

17. A passenger side inflatable restraint deployment system for a motor vehicle comprising:

an instrument panel having a deployment opening;

a side inflatable restraint module disposed within said instrument panel opposite said deployment opening and having an inflatable restraint;

a post deployment door closing said deployment opening in said instrument panel and overlapping edges of said deployment opening after said inflatable restraint has been deployed at least once; and at least one tether connected to said deployment door and operatively connected to said instrument panel to limit rearward movement of said deployment door and retain said deployment door to said instrument panel after inflation of said inflatable restraint.

* * * * *